Aug. 27, 1946.  W. K. SONNEMANN  2,406,411
UNIVERSAL SEQUENCE-CURRENT RELAYING MEANS
Filed Jan. 21, 1944
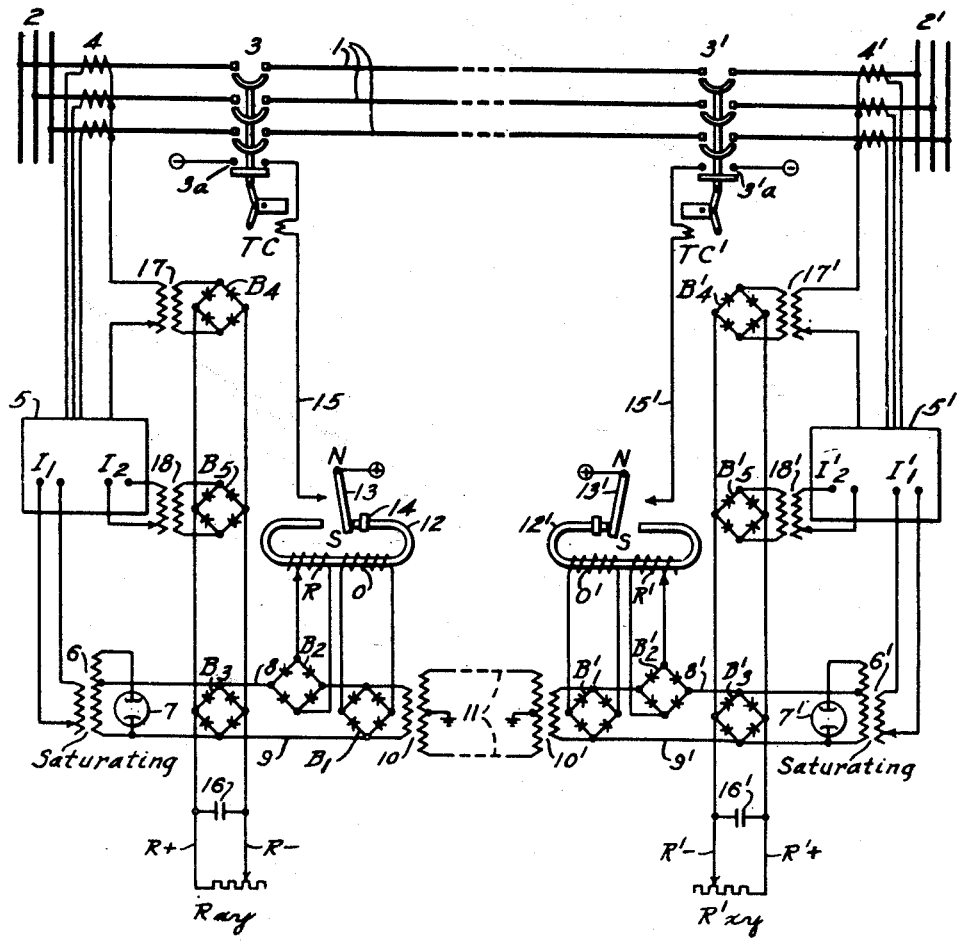
WITNESSES:
INVENTOR
William K. Sonnemann.
BY
ATTORNEY Patented Aug. 27, 1946

2,406,411

UNITED STATES PATENT OFFICE 2,406,411

UNIVERSAL SEQUENCE-CURRENT RELAYING MEANS

William K. Sonnemann, Roselle Park, N. J., assignor to Westinghouse Electric Corporation, East Pittsburgh, Pa., a corporation of Pennsylvania Application January 21, 1944, Serial No. 519,145

21 Claims. (Cl. 175—294)

My invention relates to protective relaying devices for detecting faults in polyphase lines such as transmission-lines, and it has particular relation to a universal relaying-element which is responsive to phase-sequence current-components which are compounded in a special way whereby the single relaying element is responsive with fairly comparable sensitivity to all possible different kinds of fault which may occur in a polyphase line, without being affected by which single phase is faulted to ground or which two of the three phases are involved in a double phase-to-ground fault. In short, my relaying apparatus does not have a "blind spot."

My derived phase-sequence current-responsive quantity may be utilized directly for the energization of a single relaying-element, or it may be utilized in conjunction with pilot wires or other form of a communicating-channel for comparing similarly derived voltages or currents from the two ends of a protected three-phase line-section.

Heretofore, two different types of universal sequence-current relaying-devices have been in general use, and both have been subject to the possibility, or the suspected possibility, that they may have "blind spots," or conditions of dangerously reduced sensitivity to certain very special fault-conditions, of one kind or another, depending upon the phase-relationships between the zero-sequence current component and the positive-sequence current-component, or between all three of the current-components, depending upon which single phase is faulted in a double phase-to-ground fault. In one of these previously known systems, the line-currents from all three of the line-conductors are combined in a special transformer which produces a single-phase current which is supposed to be more or less reliably responsive to any possible kind of fault.

In the other previously known universal-fault current-deriving system, the positive and zero phase-sequence components of the line-currents have been vectorially added, in a phase-sequence network known as an "HCB" network, in which it is believed that a somewhat better single-phase relaying quantity is derived, so as to be responsive to any possible kind of fault, but still having a certain amount of variation in the responsiveness, according to the variations in the phase-angles between the positive and zero phase-sequence components, which is to say, according to which phase is faulted, and what kind of fault it is. This "HCB" relaying system also makes use of a current or voltage-limiting means for producing a substantially sinusoidal output-wave of an approximately constant magnitude, which contributes considerable to the non-selectivity of the device, when subjected to faults on different phases, as described. This "HCB" relaying-system is described in a Harder Patent 2,183,646 of december 19, 1939, which is assigned to the Westinghouse Electric & Manufacturing Company.

It is an object of my present invention to provide an improvement over the Harder "HCB" relaying system, in which I avoid the utilization of the vectorial sum of a positive-sequence current-component and a zero-sequence current-component, which could conceivably total zero if the two components happened to be exactly equal to each other and exactly 180° out of phase with each other.

It is an object of my invention to utilize a response to only the positive-sequence current component, and to supervise or alter the responsiveness to this component, in accordance with the magnitude, but not the phase, of the zero-sequence current-component, or the negative-sequence current-component, or both the zero-sequence and the negative-sequence current-components. In this way, I provide a relay which can have the same sensitivity to all different kinds or locations or magnitudes of fault, or any desired relative degrees of sensitivity to different kinds of faults, in a relaying system which has no "blind spot" and which is not at all affected by the particular phase which happens to be faulted.

With the foregoing and other objects in view, my invention consists in the systems, circuits, combinations, elements, apparatus, and methods, hereinafter described and claimed, and illustrated in the accompanying drawing, the single figure of which is a diagrammatic view of circuits and apparatus illustrating my invention in a preferred form of embodiment.

In the drawing, I have illustrated the invention as being applied to the protection of a line-section 1 which is a part of a three-phase transmission-system, the protected line-section 1 being connected between buses 2 and 2' at two different stations. Since the equipment at each line-terminal or station is identical, and symmetrically disposed with respect to the center of the protected line-section 1, I shall largely confine my explanation and description to the equipment at the terminal represented by the three-phase bus 2, the corresponding equipment at the other terminal being distinguished by primed letters or numerals, as in the case of the bus 2'.

The equipment at each station, such as the left-hand station, in the illustrated form of embodiment of the invention, includes a three-phase line-segregating circuit-interrupting means, such as a circuit-breaker 3, which has an auxiliary make-switch 3a, and a trip-coil TC. The equipment also includes a bank of three-phase line-current transformers which supply energy to a phase-sequence network or networks 5 having output-terminals $I_1$ in which there appears a single-phase current or voltage which is selectively responsive solely to the positive-sequence component of the line-current. The particular network 5 which is shown in the figure also has a second pair of terminals $I_2$ in which there appears a single-phase current or voltage which is selectively responsive solely to the negative-sequence component of the line-current.

The positive-sequence output $I_1$ of the current-responsive phase-sequence network 5 is utilized, in the manner described in the Harder patent, to energize an adjustable saturating transformer 6, which produces peaked wave-forms of more or less limited magnitude, the peaks of which are removed by a glow-lamp 7 or similar means, whereby a fairly sinusoidal wave-form is obtained in the relaying circuit which is provided by the output-terminals 8 and 9 of the device, as explained in the Harder patent, except that I utilize a response to only the positive-sequence component, rather than a response to both the positive and zero-sequence components, in energizing the saturating transformer 6.

In the illustrated form of embodiment of the invention, the output of the network-terminals 8 and 9 is applied to an insulating transformer 10 which is connected to one end of a pair of pilot-wires 11 which extend to similar equipment at the far end of the protected line-section 1, the particular pilot-wire system which is illustrated being of the well-known current-circulating type, which circulates current when there is no fault on the protected line-section 1, although other pilot-wire systems may be utilized, as will be understood by the skilled workers of the art.

Any suitable means may be utilized for responding to the current or voltage which appears in the network-terminals 8 and 9, and this response may be either a simple overcurrent or overvoltage response to the current or voltage in the terminals 8 and 9 alone, or it may be a comparative response of any sort, which takes into consideration a comparison of the output of the terminals 8 and 9 at one station, as compared with the output of the corresponding terminals 8' and 9' at the other station, said comparison being effected through the pilot-wires 11, or any equivalent communicating-channel means extending from another line-terminal.

The particular embodiment of my invention which is illustrated in the drawing utilizes a ratio-differential protective relay 12, which is illustrated as a polarized relay having a polarized movable armature 13, the polarization of which is indicated by the letters N and S representing north and south poles, respectively. A polarized form of differential relay 12 is shown, for the sake of the greater sensitivity and the lower burden which is obtainable in this type of relay, but the invention is obviously not limited to any particular type of relay. In order to prevent the relay from responding too quickly so that it would respond to the pulsations or ripples of its energization, it may be provided with a lag-ring 14, as will be well understood. The movable element 13 of the differential relay 12 is utilized to control a trip-circuit 15 which supplies tripping-energy to the trip-coil TC, through the auxiliary breaker-switch 3a, so as to produce a three-pole circuit-interrupting operation of the breaker 3, in the illustrated form of embodiment of the invention.

The energization of the relay 12, in the illustrated form of embodiment of the invention, is the same as described and claimed in the Harder patent. The relay is provided with a strong operating-coil O, and a weaker restraining-coil R, which is illustrated as being adjustable. Since the relay is a polarized relay, the operating and restraining windings O and R must be energized with unidirectional currents, which are illustrated as being obtained through rectifier-bridges, or other full-wave rectifiers, $B_1$ and $B_2$, respectively. The bridge $B_1$ which energizes the operating coil O is energized across the terminals of the insulating transformer 10, while the bridge $B_2$, which supplies the restraint-winding R, is serially connected in series with the lead 8, or between the lead 8 and the insulating transformer 10.

The system so far described in detail is the same as one of the forms of embodiment which are illustrated in the Harder patent, except that the saturating transformer 6 is energized responsively to only the positive-sequence current, rather than the vectorial sum of the positive and zero-sequence components.

There will, of course, be positive-sequence components present in all possible kinds or degrees of faults on the protected line-section 1, but the positive-sequence component cannot, in general, be utilized, alone, as a fault-detector, even with the aid of the so-called constant-magnitude devices 6 and 7, because the magnitude of the positive-sequence component of the fault-current, for single ground-faults, for example, may be considerably less than the balanced power-currents of the line under normal fault-free operation. It is an essential feature of my present invention, therefore, that the sensitivity or response-proportionality of the response to the positive-sequence current-component is increased, or monitored, by the zero-sequence current-component, or by the negative-sequence current-component, or both.

Referring to the drawing, it will be noted that the sensitivity of the positive-sequence response is reduced by drawing off energy through a variable resistor $R_{xy}$, which is connected across the network-terminals 8 and 9 through a rectifier-bridge $B_3$, or other full-wave rectifier, which supplies unidirectional-current energy to the positive and negative terminals R+ and R− of the resistor $R_{xy}$. In general, it is desirable to suppress the ripples in the rectified-current output-circuit of the bridge $B_3$, which may be accomplished by any suitable means, such as a shunt-connected capacitor 16.

In the illustrated form of embodiment of my invention, I provide an adjustable transformer 17, which may or may not be saturable, which is energized from the residual-current circuit of the line-current transformers 4, so as to be responsive to the zero-sequence current-component, and this transformer 17 is utilized to energize a rectifier-bridge $B_4$ which also supplies current, in the same polarity as the bridge $B_3$, to the terminals R+ and R− of the resistor $R_{xy}$, the same capacitor 16 serving to absorb the ripples of the rectified-current output of the bridge $B_4$.

In the illustrated form of embodiment of my invention, I also provide another adjustable transformer 18, which also may or may not be saturable, which is energized from the negative-sequence terminals L2 of the current-responsive sequence-network 5. The transformer 18 energizes a rectifier-bridge B5, the output-terminals of which are connected to the resistor-terminals R+ and R—, in the same polarity as the outputs of the bridges B3 and B4.

In operation, during normal power-transmitting conditions when there is a balanced three-phase load on the transmission-line, but no fault thereon, there will be no zero-sequence current-component and no negative-sequence current-component, so that the network-terminals 8 and 9 will feed a considerable amount of energy into the resistor Rxy, none of this energy going through the bridges B4 and B5, which are connected in such polarity that current cannot flow from the resistor-terminals R+ and R— into said bridges, except for very small leakage-currents which may be assumed to be negligible, so far as our present considerations are concerned. The resistor Rxy is chosen so as to have such a magnitude, in comparison with the serially connected positive-sequence-circuit impedances of the network 5—6—7 and the bridge B3, that the sensitivity of response to the positive-sequence currents may be reduced to any desired level or value.

When a three-phase fault occurs on the protected line-section, a very large positive-sequence current-component is present in the line-current, and the sensitivity of response is adjusted so that the relay 12 will have the desired amount of responsivity to the positive-sequence component under this fault-condition.

If a single line-to-ground fault should occur, the positive-sequence component of the fault-current may be so small that the component which appears in the network-terminals 8—9 may be no more than is necessary to produce the required responsivity in the relay 12, even though no energy is withdrawn from the terminals 8—9 by the resistor Rxy. This condition, whereby the network-terminals 8 and 9 supply no energy to the resistor Rxy, or any intermediate condition, as in the case of a double line-to-ground fault, is brought about by the zero-sequence-responsive bridge B4, which maintains, across the resistor-terminals R+ and R—, a potential which is responsive to the magnitude of the zero-sequence component, reduced by the serially connected impedances of the zero-sequence-energized transformer 17 and bridge B4, with sufficient sensitivity of response so that the rectified zero-sequence-responsive voltage, put out by the bridge B4, may be equal to the rectified voltage which is put out by the bridge B3 with a reduced current-flow from the circuit 8—9, through the bridge B3, to the terminals R+ and R—; that is, with a reduced voltage-drop in the effective positive-sequence-circuit impedance of the elements 5, 6, 7 and B3. The rectified voltage of B4 may even be larger than that of B3, in which case B4 does not feed energy back into the terminals 8 and 9 through the bridge B3, because the polarity of the rectifiers of the bridge B3 is directed the wrong way for such energy-transfer, and the result is simply that no energy is withdrawn from the terminals 8 and 9 by the bridge B3 under such conditions.

In either event, the effect of the zero-sequence-energized bridge B4, in parallel to the positive-sequence-energized bridge B3, is to cause the amount of energy which is withdrawn from the positive-sequence network-terminals 8 and 9, by the bridge B3, to be reduced in proportion to the amount of energy which is supplied to the resistor Rxy by the bridge B4, until, in the limiting case, no energy at all is withdrawn from the positive-sequence network-terminals 8 and 9 by the bridge B3.

The zero-sequence-responsive bridge B4 may be utilized alone, without the negative-sequence-responsive bridge B5, to monitor the positive-sequence-responsive terminals 8 and 9, so as to increase the sensitivity of the positive-sequence response in accordance with the amount of zero-sequence current-component which is present in the fault-current, up until the point of maximum sensitivity is reached, when no current is withdrawn from the network-terminals 8—9 by the resistor Rxy. Since the zero-sequence current-component is not present at all, except under fault-conditions, the zero-sequence response can be made extremely sensitive, being limited only by the necessity for avoiding a deleterious response to the spurious zero-sequence components which are sometimes produced by faulty matching of the line-current transformers 4. In this manner, the relay 12 can have a high sensitivity to all faults having any zero-sequence current-components, so that the ability of the relay 12 to respond to ground-faults can be made to match its ability to respond to faults which have no zero-sequence component.

There are only two kinds of fault which have no zero-sequence component, namely, a solid three-phase fault involving no ground, in which case the fault-currents are extremely heavy, and the minimum positive-sequence sensitivity is desirable, and phase-to-phase faults involving only two of the line-conductors, but no ground, in which case the positive-sequence component is 58% as great as with a three-phase fault, for the same fault-amperes, which is still generally amply sufficient to enable the relay 12 to respond easily to both of these types of fault, without danger of being overburdened on the more severe fault.

It is possible, however, and sometimes desirable, to utilize a negative-sequence monitoring, instead of, or in addition to, the zero-sequence monitoring which has just been described. The negative-sequence response usually entails the use of a network which imposes a greater burden normally upon the current-transformers 4 than the network which delivers the zero-sequence response, which does not normally entail any burden, but it has certain advantages, in that the negative-sequence current-component is not present, at all, under normal power-transmitting conditions, when there is no fault on the transmission system, but it is present in all possible kinds of fault, including the phase-to-phase fault as well as the single-phase ground-fault, except a balanced three-phase fault.

It is possible, therefore, to utilize a very sensitive response to the negative-sequence current-component, from the terminals I2, to energize the rectifier-bridge B5, so as to produce a rectified voltage, which is applied to the resistor-terminals R+ and R—, which bears any desired relation to the corresponding positive-sequence-responsive rectified voltage of the bridge B3, under any desired conditions, the operation being similar to that which has already been described in connection with monitoring by the zero-sequence responsive bridge B4.

As previously intimated, both of the monitoring bridges B4 and B5 can be utilized together, in which case, whichever voltage-response is the greater, will take control, and control the rectified voltage which appears across the resistor-terminals R+ and R−, since no energy can be fed back, in the reverse direction, into any one of the parallel-connected bridges B₃, B₄, and B₅, the output-terminals of which are connected in parallel across the resistor-buses R+ and R−.

It will be observed that, in a way, my present system is an application of the "largest-phase" relaying-system which is shown in the Harder Patent 2,242,950, of May 20, 1941, assigned to the Westinghouse Electric & Manufacturing Company. Harder there utilized a similar parallel-bridge system for obtaining a response to whichever phase was the largest, whether the phase-A current, or the phase-B current, or the phase-C current, or the residual current times any desired multiplying-constant. In my present relaying system, however, I do not determine the largest phase, but, in a way, I determine the largest phase-sequence component (with suitable multiplying-factors), comparing the magnitudes, but not the phase-relationships, of the several components which are applied to the input-terminals of the several parallel-connected rectifier-bridges B₃, B₄, and B₅, or as many of said bridges as may be utilized.

It will be observed that the sensitivity of the response to the positive-sequence component, as monitored by the zero-sequence or the negative-sequence components, or both, as obtained in my present system, is not at all affected by the phase-relationships between alternating currents or voltages which represent these various phase-sequence components. This is particularly true when some sort of ripple-suppressor, such as the capacitor 16 or any equivalent device, is utilized for substantially suppressing or withdrawing the ripples from the rectified-voltage outputs of the various parallel-connected bridges B₃, B₄, and B₅. In this manner, I obtain, in a single device, a response with any desired uniformity of sensitivity, to all kinds of faults, without any "blind spots" and without being affected by which phase the fault is on.

It will be understood that the magnitude-control elements 6 and 7, which were carried over from the Harder "HCB" system, may, or may not, be utilized. This feature is useful in reducing the effect of differences in the severity of the fault, particularly the severity of a three-phase fault, but my explanation of the invention has been given on the basis of properly increasing the sensitivity of the positive-sequence response in accordance with the monitoring zero-sequence or negative-sequence components, or both, without reference to the presence or absence of the magnitude-limiting feature 6—7. It will be understood that, even when the magnitude-limiting feature 6—7 is utilized, my monitoring-combination may be effective, even at voltages before the saturating effect of the transformer 6 begins to be felt, so that the output-circuit 8—9 may be monitored, even though the positive-sequence component is not large enough to saturate the transformer 6.

It will further be observed that, while I have illustrated a particular kind of pilot-wire system, and a particular kind of differential relay 12, my invention is not limited to either one of these details, as it is applicable, generally, to any device which may be connected in any manner whatsoever, so as to be energized, at least in part, in response to the monitored network-terminals 8 and 9. I desire, therefore, that the appended claims shall be accorded the broadest construction consistent with their language and the prior art.

I claim as my invention:

1. In a relaying system for protecting a polyphase line, means for providing a relaying circuit carrying a single-phase electrical quantity which is responsive to the positive-sequence component of the line-current, means for energizing a resistor from said relaying circuit through a full-wave rectifier, means for deriving another sequence component of the line-current, means for energizing the same resistor from said other sequence component through another full-wave rectifier in the same polarity as the first-mentioned energization, and relaying means having an energization from said relaying circuit.

2. In a relaying system for protecting a polyphase line, means for providing a relaying circuit carrying a single-phase electrical quantity which is responsive to the positive-sequence component of the line-current, means for energizing a resistor from said relaying circuit through a full-wave rectifier, means for deriving another sequence component of the line-current, means for energizing the same resistor from said other sequence component through another full-wave rectifier in the same polarity as the first-mentioned energization, communicating-channel means adapted to compare said single-phase electrical quantity with a quantity similarly provided at another point in the line, and relaying means having energization from both said relaying circuit and said communicating channel.

3. In a relaying system for protecting a polyphase line, means for deriving the positive-sequence component of the line-current, magnitude-limiting means for providing a relaying circuit having a single-phase electrical quantity which is responsive to said positive-sequence component, means for energizing a resistor from said relaying circuit through a full-wave rectifier, means for deriving another sequence component of the line-current, means for energizing the same resistor from said other sequence component through another full-wave rectifier in the same polarity as the first-mentioned energization, and relaying means having an energization from said relaying circuit.

4. In a relaying system for protecting a polyphase line, means for deriving the positive-sequence component of the line-current, magnitude-limiting means for providing a relaying circuit having a single-phase electrical quantity which is responsive to said positive-sequence component, means for energizing a resistor from said relaying circuit through a full-wave rectifier, means for deriving another sequence component of the line-current, means for energizing the same resistor from said other sequence component through another full-wave rectifier in the same polarity as the first-mentioned energization, communicating-channel means adapted to compare said single-phase electrical quantity with a quantity similarly provided at another point in the line, and relaying means having energization from both said relaying circuit and said communicating channel.

5. The invention as defined in claim 1, characterized by said other sequence component being the zero-sequence component.

6. The invention as defined in claim 2, characterized by said other sequence component being the zero-sequence component.

7. The invention as defined in claim 3, characterized by said other sequence component being the zero-sequence component.

8. The invention as defined in claim 4, characterized by said other sequence component being the zero-sequence component.

9. The invention as defined in claim 1, characterized by said other sequence component being the negative-sequence component.

10. The invention as defined in claim 2, characterized by said other sequence component being the negative-sequence component.

11. The invention as defined in claim 3, characterized by said other sequence component being the negative-sequence component.

12. The invention as defined in claim 4, characterized by said other sequence component being the negative-sequence component.

13. The invention as defined in claim 1, characterized by said relaying system having two such other-sequence deriving-means and energizing-means, one involving the zero-sequence component and the other involving the negative-sequence component of the line-current.

14. The invention as defined in claim 2, characterized by said relaying system having two such other-sequence deriving-means and energizing-means, one involving the zero-sequence component and the other involving the negative-sequence component of the line-current.

15. The invention as defined in claim 3, characterized by said relaying system having two such other-sequence deriving-means and energizing-means, one involving the zero-sequence component and the other involving the negative-sequence component of the line-current.

16. The invention as defined in claim 4, characterized by said relaying system having two such other-sequence deriving-means and energizing-means, one involving the zero-sequence component and the other involving the negative-sequence component of the line-current.

17. In a relaying system for protecting a polyphase line, phase-sequence means for developing two different single-phase control-voltages, in two different relay-circuits, in response to two different phase-sequence functions of the line-current at the relaying station, relaying means having an energization from one of said relay-circuits, a direct-current load-device, and two separate rectifier-means for respectively energizing said direct-current load-device from said two relay-circuits at the relaying station.

18. In a relaying system for protecting a polyphase line, phase-sequence means for developing two different single-phase control-voltages, in two different relay-circuits, in response to two different phase-sequence functions of the line-current at the relaying station, communication-channel means for comparing the single-phase control-voltage of one of said two relay-circuits with the control-voltage of a relay-circuit similarly provided at another point in the line, relaying means having energization from both said communicating-channel and said relay-circuit at said relaying station, a direct-current load-device, and two separate rectifier-means for respectively energizing said direct-current load-device from said two relay-circuits at the relaying station.

19. In a relaying system for protecting a polyphase line, phase-sequence means for developing a single-phase control-voltage in a relay-circuit in response to a phase-sequence function of the line-current at the relaying station, fault-detector means for selectively responding to line-current conditions other than balanced positive-sequence currents at the relaying station, means for utilizing said fault-detector means for at times increasing the response-proportionality of said single-phase control-voltage which is developed in said relay-circuit in response to said phase-sequence function of the line-current at the relaying station, and relaying means having an energization from said relay-circuit.

20. In a relaying system for protecting a polyphase line, phase-sequence means for developing a single-phase control-voltage in a relay-circuit in response to a phase-sequence function of the line-current at the relaying station, fault-detector means for selectively responding to line-current conditions other than balanced positive-sequence currents at the relaying station, means for utilizing said fault-detector means for at times increasing the response-proportionality of said single-phase control-voltage which is developed in said relay-circuit in response to said phase-sequence function of the line-current at the relaying station, communicating-channel means for comparing the single-phase control-voltage of said relay-circuit with the control-voltage of a relay-circuit similarly provided at another point in the line, and relaying means having energization from both said communicating-channel and said relay-circuit at said relaying station.

21. Multi-responsive fault-detector means, adapted to be responsive to a plurality of different kinds and phases of ground- and phase-faults on a three-phase line, comprising current-responsive voltage-developing means operative to develop a voltage which is responsive to a function of the three-phase line-current, means responsive to said developed voltage, ground-fault detector-means for selectively responding to ground-fault line-conditions more sensitively than said current-responsive voltage-developing means, and means controlled by said ground-fault detector-means for making said current-responsive voltage-developing means respond more sensitively to said function of the three-phase line-current.

WILLIAM K. SONNEMANN.